R. J. ALTGELT.
CULTIVATOR.
APPLICATION FILED JUNE 8, 1916.
1,217,383.
Patented Feb. 27, 1917.
2 SHEETS—SHEET 2.
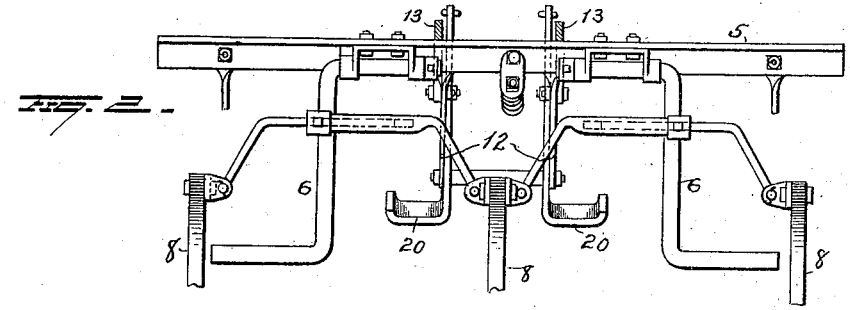
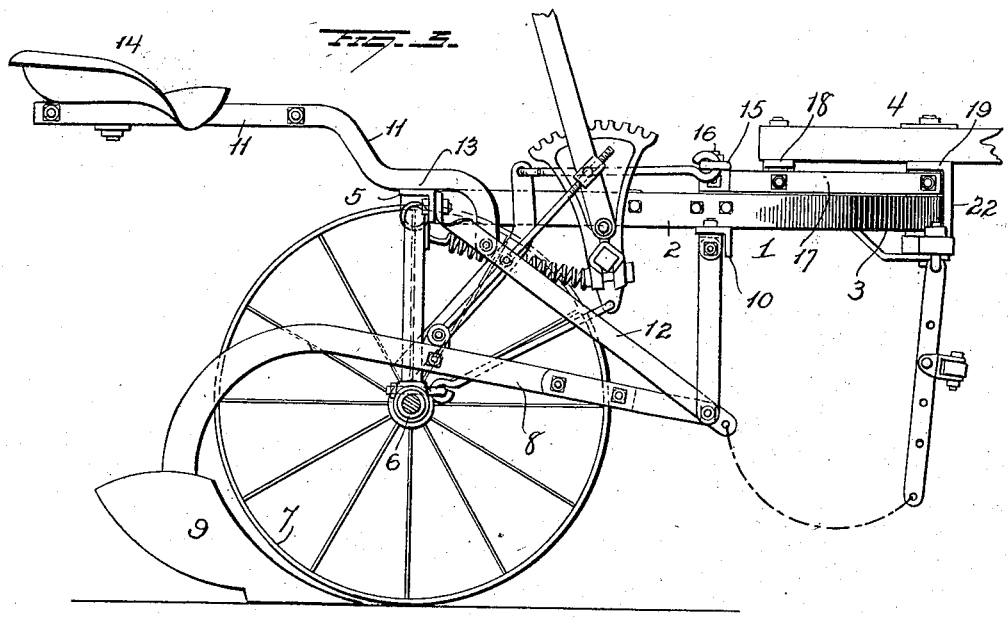
WITNESSES
INVENTOR

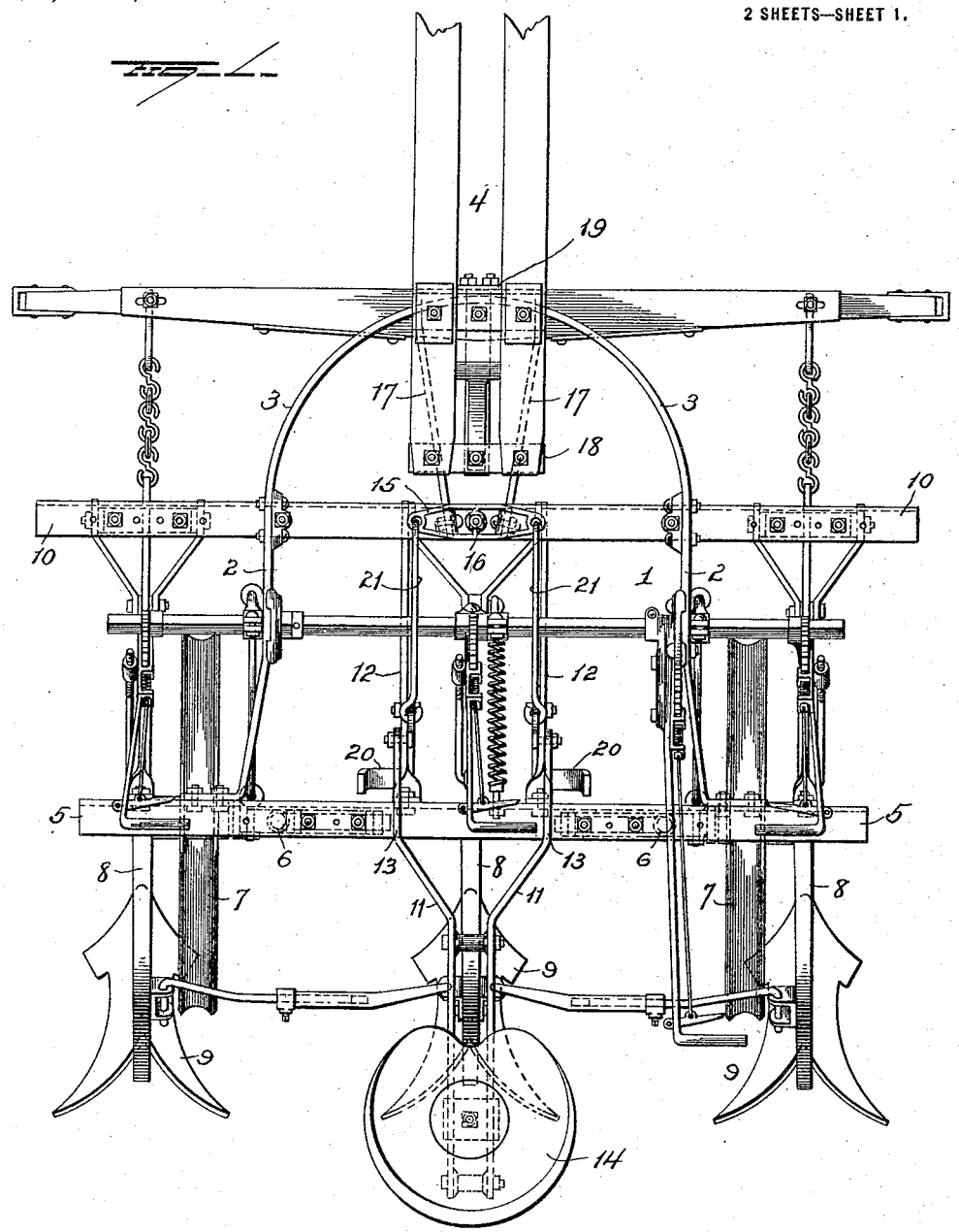

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

CULTIVATOR.

1,217,383.  Specification of Letters Patent.  Patented Feb. 27, 1917.

Original application filed February 26, 1915, Serial No. 10,787. Divided and this application filed June 8, 1916. Serial No. 102,436.

*To all whom it may concern:*

Be it known that I, RUDOLPH J. ALTGELT, a citizen of the United States, and a resident of South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in cultivators, the same being a division of application for patent filed by me on the 26th day of February, 1915, and designated by Serial No. 10,787,—the object of my present invention being to provide improved means for steering the machine in such manner as to keep the plow bodies in proper positions with relation to the rows, even though the team may be more or less diverted.

With this and other objects in view, the invention consists in certain novel features of construction and combinations of parts as hereinafter set forth and pointed out in the claims.

In the accompanying drawings; Figure 1 is a plan view of a cultivator embodying my improvements; Fig. 2 is a rear view, and Fig. 3 is an elevation.

1 represents a horizontal frame which may comprise parallel side members 2 and a curved forward portion 3,—the latter also serving as a track or guideway for a part carried by the tongue 4. The rear ends of the side members of the frame are rigidly secured to a rear cross beam 5 which may have a length greater than the width of the frame 1. The upper members of crank axles 6 are connected with the cross beam 5, through the medium of suitable bearings secured to said cross bar and the journal ends of said axles are mounted in the hubs of carrying wheels 7.

Cultivator beams 8 (carrying bases or soil-engaging members 9 at their rear ends) are connected with a forward cross beam 10 of the frame in any suitable manner, such for example, as disclosed in my said application No. 10,787 of which this case is a division.

Seat bars 11 are attached at their forward ends to the diagonal braces 12 of the framework and are bent to form shoulders 13 which rest upon the rear beam 5, the rear portions of said seat bars being brought nearer together and disposed horizontally to receive a seat 14 which is adjustably secured thereto. Approximately in line with the seat and seat bars, a cross head 15 is pivotally mounted upon the forward cross beam 10, by means of a pivot bolt 16. Bars 17, 17 are secured at their rear ends to the cross head 15 at respective sides of the pivotal support of the latter and the forward portions of these bars are secured to the cross bars 18 and 19 which connect the parallel members of the tongue 4. Foot levers 20 are pivoted between their ends to the diagonal braces 12 and the upper arms of these foot levers are connected, by means of rods 21 with respective ends of the cross head 15.

By operating one or the other of the foot levers, or by operating them both simultaneously in opposite directions, motion will be imparted through the rods 21 to the pivoted cross-head 15, and this cross head being rigidly connected with the tongue through the medium of the bars 17, the tendency will be to move the tongue laterally, but as the tongue cannot be thus moved laterally by reason of its connection with the team, the frame of the cultivator and the various appliances which it carries will be swung on the pivotal connection at 16 with the tongue, being guided by a loop 22 secured to the tongue, and thus the cultivator may be steered and the cultivator bodies kept in proper relation to the rows even though the team be more or less diverted.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a wheeled frame, soil engaging parts carried thereby and a tongue, of a cross head pivoted to the frame, connections between said cross head and the tongue, pivoted foot levers, and connections between said foot levers and the cross head.

2. The combination with a wheeled frame, soil engaging parts carried thereby and a tongue, of a cross head pivoted to the frame, bars secured to said cross head at respective sides of its pivot and also secured to said tongue, foot levers, and connections between said cross head and said foot levers.

3. The combination with a wheeled frame having a curved forward end, soil-engaging parts connected with the frame, and a tongue, of a guide connecting said tongue with the curved forward end of the frame, foot levers, a cross head pivoted to the frame, rigid connections between said tongue and cross head, and connections between said cross head and foot levers.

4. The combination with a main horizontal frame, wheels, and axle members, of forward and rear cross beams rigid with the main frame, soil engaging parts connected with the forward cross bar, a tongue movably connected with the main frame forwardly of its rear end, a cross head pivoted to the forward cross beam, rigid connections between said cross head and the rear end of the tongue, and foot operated operating means for said cross head.

5. The combination with a wheeled frame having a curved forward end, soil-engaging members, and a tongue, of a guide connecting said tongue with the curved forward end of the frame, foot levers, and connections between said foot levers and the tongue for causing the frame to be shifted relatively to the tongue when said foot levers are operated.

In testimony whereof, I have signed this specification in the presence of two subscribing witnesses.

RUDOLPH J. ALTGELT.

Witnesses:
  E. SAUMENICHT,
  J. CAVIEZEL.

Copies of this patent may be obtained for five cents each, by addressing the "Commissioner of Patents, Washington, D. C."